(12) United States Patent
Hoague (10) Patent No.: US 6,186,140 B1
(45) Date of Patent: *Feb. 13, 2001

(54) RESPIRATORY FILTER ELEMENT HAVING A STORAGE DEVICE FOR KEEPING TRACK OF FILTER USAGE AND A SYSTEM FOR USE THEREWITH

(75) Inventor: Michael Paul Hoague, New Market, MD (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/818,797

(22) Filed: Mar. 14, 1997

(51) Int. Cl.[7] .................................................. A61M 16/00
(52) U.S. Cl. .............................. 128/202.22; 128/201.25; 128/205.23
(58) Field of Search ......................... 128/202.22, 205.12, 128/20, 201.25, 204.26, 205.23, 205.25, 205.27, 206.12, 206.21

(56) References Cited

U.S. PATENT DOCUMENTS

| | | |
|---|---|---|
| 1,537,519 | 5/1925 | Yablick . |
| 3,027,865 | 4/1962 | Kautz et al. . |
| 3,201,772 | 8/1965 | Ladusaw . |
| 3,250,873 | * 5/1966 | Kudlaty et al. ................. 128/202.22 |

(List continued on next page.)

FOREIGN PATENT DOCUMENTS

| | | |
|---|---|---|
| 3914664 | * 11/1990 | (DE) . |
| 94 07 866 U | * 8/1994 | (DE) . |
| 90121361 | * 9/1991 | (EP) . |
| WO 94/22551 | 10/1994 | (WO) .......................... B01D/35/143 |

OTHER PUBLICATIONS

Product Literature for *3M Positive Pressure Respirators* (70–0701–3368–4(683.5)JR), Jun. 1998.
*Webster's Ninth New Collegiate Dictionary*, ©1986, pp 298–299. ISBN 0–87779508–8.*

*Primary Examiner*—Aaron J. Lewis
(74) *Attorney, Agent, or Firm*—Pedro P. Hernandez; Karl G. Hanson (57) ABSTRACT

The present invention provides for a filter assembly (124) which includes a filter element (128) and a memory device (402). The memory device (402) allows for a record of the filter element's usage to be available at all times even if the filter assembly (124) is moved from one filtering system to another one. In another embodiment of the invention, the filter assembly (124) interacts with a filtering device such as air unit (130) which periodically updates the memory device (402) while the air unit (130) is operational. The air unit (130) also periodically checks to see if the filter assembly (124) has reached the end of its useful life. If so, the air unit provides an audible and/or visual alarm.

8 Claims, 5 Drawing Sheets

U.S. PATENT DOCUMENTS

| | | |
|---|---|---|
| 3,718,982 | 3/1973 | Deaton . |
| 3,740,931 | 6/1973 | Nowicki . |
| 3,950,155 | 4/1976 | Komiyama . |
| 3,966,440 | 6/1976 | Roberts . |
| 4,014,209 | 3/1977 | Emerick . |
| 4,040,042 | 8/1977 | Mayer . |
| 4,050,291 | 9/1977 | Nelson . |
| 4,154,586 | 5/1979 | Jones et al. . |
| 4,155,358 | 5/1979 | McAllister et al. . |
| 4,365,627 | 12/1982 | Wing . |
| 4,610,703 | 9/1986 | Kowaiczyk . |
| 4,623,451 | 11/1986 | Oliver . |
| 4,698,164 | 10/1987 | Ellis . |
| 4,762,611 | 8/1988 | Schipper . |
| 4,772,386 | 9/1988 | Grout et al. . |
| 4,851,818 | 7/1989 | Brown et al. . |
| 4,873,970 * | 10/1989 | Freidank et al. ............... 128/202.22 |
| 4,918,426 | 4/1990 | Butts et al. . |
| 4,925,551 | 5/1990 | Lipshultz et al. . |
| 4,999,101 | 3/1991 | Tadayon . |
| 5,018,518 * | 5/1991 | Hubner ........................... 128/202.22 |
| 5,076,912 | 12/1991 | Belz et al. . |
| 5,131,932 | 7/1992 | Glucksman . |
| 5,141,309 | 8/1992 | Worwag . |
| 5,190,643 | 3/1993 | Duncan et al. . |
| 5,236,477 | 8/1993 | Koketsu . |
| 5,236,578 | 8/1993 | Oleskow et al. . |
| 5,362,383 | 11/1994 | Zimmerman et al. . |
| 5,378,254 | 1/1995 | Maly et al. . |
| 5,413,097 * | 5/1995 | Birenheide et al. ............ 128/202.22 |
| 5,429,649 | 7/1995 | Robin . |
| 5,524,616 * | 6/1996 | Smith et al. .................... 128/202.22 |
| 5,666,949 * | 9/1997 | Debe et al. ..................... 128/202.22 |

* cited by examiner

RESPIRATORY FILTER ELEMENT HAVING A STORAGE DEVICE FOR KEEPING TRACK OF FILTER USAGE AND A SYSTEM FOR USE THEREWITH

FIELD OF THE INVENTION

This invention relates in general to the field of filters, such as air, gas and liquid filters and more particularly, to a filter having a storage device for keeping track of its usage and a system for use therewith.

BACKGROUND OF THE INVENTION

When working in environments laden with dust, fumes, air borne bacteria, mists, etc. it is common to wear a powered air-purifying respirator or other type of respiratory protection device. Powered air-purifying respirators protect wearers from such health threatening conditions as asbestos-countering dusts, radionuclides, blood borne pathogens, etc.

A typical powered-air respiratory system will include a head cover having a face shield and a belt-worn air filter unit which provides a flow of filtered air to the head cover via a breathing tube. The air filter unit will contain within its housing a filter such as a high efficiency particulate air (HEPA) filter or other type of filter for filtering out the impurities in the environment. During operation, ambient air is drawn through the belt-mounted air filter unit by a conventional blower motor/impeller assembly (hereinafter referred simply as the "blower motor assembly"). The unfiltered air is then drawn through the air unit's internal filter and the filtered air is then sent into the head cover.

In order to maintain the effectiveness of the respiratory system in filtering out impurities, it is critical that the disposable filter located in the air filter unit be replaced on a periodic basis. Failure to replace the filter on a timely basis causes the system to provide less than optimal filtering capability and can endanger the health of the respiratory system users.

Businesses such as those that have many personal respiratory systems for use by their employees will typically have a maintenance schedule which notifies them when each of the filters in each respiratory unit needs to be replaced. Although effective most of the time, this type of scheduled maintenance approach requires monitoring via a schedule which may or may not be followed on a timely basis. A bigger problem occurs if a filter from one respiratory system is exchanged with a filter from another system or with a previously used filter. In this particular situation, one may lose track of when to replace the particular filter since the filters are no longer associated with the same powered air unit. This situation may cause a filter to stay in service long after it has reached its end-of-life condition and has lost some or all of its filtering capabilities.

Although the above discussion has highlighted the problems associated with personal respiratory systems, the same problems can occur with any filtering device or system that uses a replaceable or portable filter. For example HVAC (heating/ventilation/air conditioning) systems, liquid filtering systems such as water purification systems for electronic assembly plants, automotive air and cabin filters, etc.

Given the portable nature of most filters used in personal respiratory systems and other types of fluid (e.g., air, gas and liquid) filtering devices/systems, a person who is changing a replaceable filter is usually never certain of how much life is left in the filter unless he installs a new filter straight from its original packaging. Otherwise, it could very well be that the filter that is being installed had been previously used elsewhere for some period of time. In these situations, it becomes very difficult to gauge a filter's end-of-life and determine when the filter should be changed. Using a filter beyond its useful life can cause all sorts of problems depending on the type of filtering system in question. For example, in the case of machinery, using a filter beyond its useful life can cause the machinery to prematurely fail. While in respiratory systems, a used-up filter can subject the user to serious health problems. A need thus exists in the art for a filter and system which can overcome the problems stated above.

SUMMARY OF THE INVENTION

The present invention provides for a filter (filter assembly) which can keep track of its usage via a storage device located in the filter (filter assembly) which communicates with the particular filtering system/device (e.g., personal respiratory system, etc.) the filter is used in. The storage device keeps track of the filter's usage even if the filter is used in more than one filtering system/device.

In another embodiment of the invention, a filtering system includes a filter unit which communicates with a filter having a storage device. During operation, the filtering system periodically updates the storage device found in the filter with regards to the filter's usage. Upon the filter reaching its predetermined end-of-life condition, the filtering system can alert the user of the filter's end-of-life condition via either visual or audio alerts or both.

DETAILED DESCRIPTION OF THE PREFERRED EMBODIMENT

Figure 1:
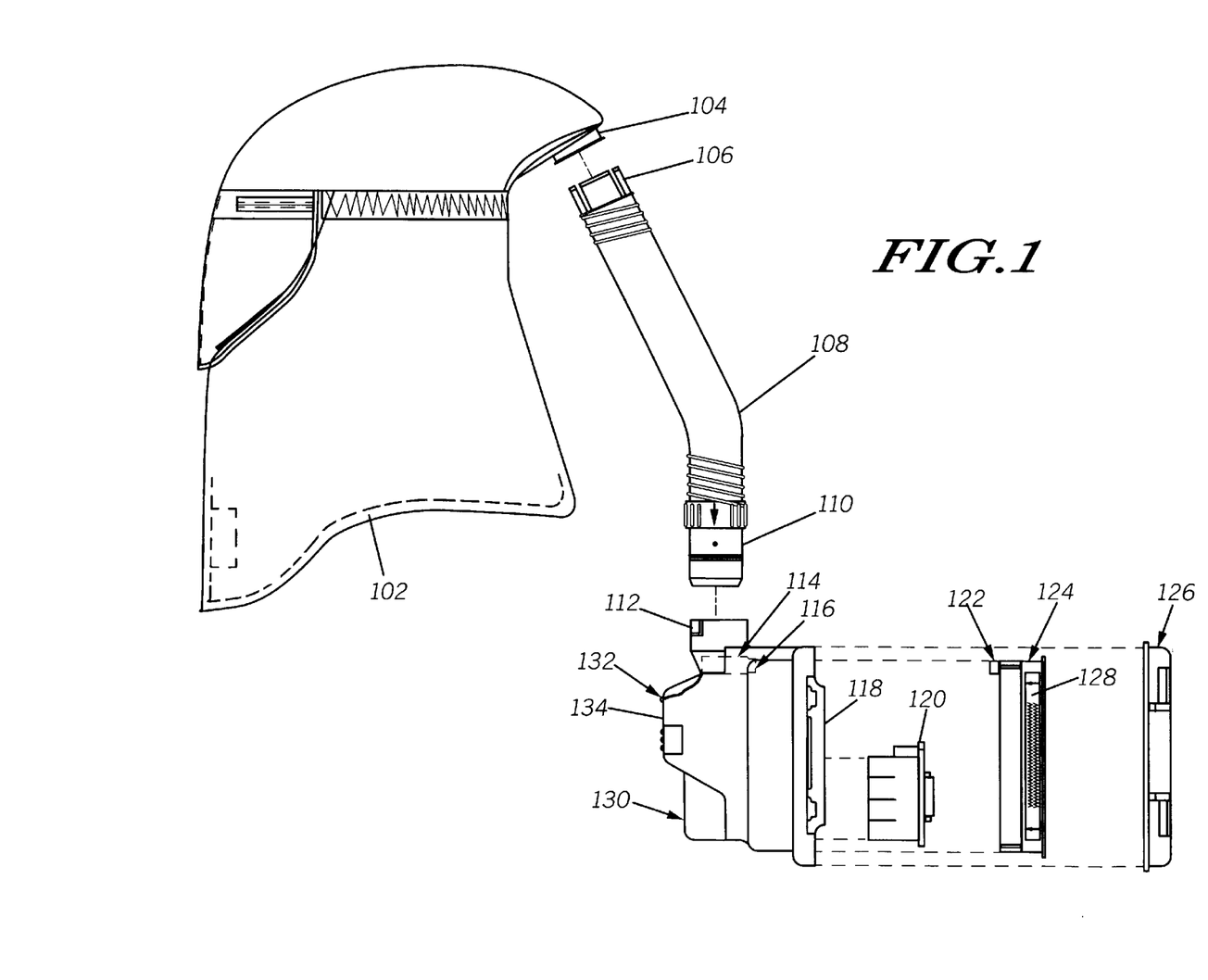
FIG. 1 shows an exploded view of a respiratory system in accordance with the present invention.

Referring to the drawings and in particular to FIG. 1, there is shown an exploded view of a filtering system such as a personal respiratory system in accordance with the preferred embodiment. It is worth noting here that although the preferred embodiment will be described in terms of a personal respiratory system, the present invention is not so limited, and can be used in most fluid (e.g., air, gas and liquid, etc.) filtering applications in which a replaceable filter is utilized.

The respiratory system 100 of the preferred embodiment comprises a disposable headcover 102 with optional cape. The headcover 102 further includes a face shield for protecting the face area. The disposable headcover can be manufactured from appropriate protective fabric commercially available for such use such as TYVEK® fabric sold by E.I. Du Pont De Nemours & Co., Inc. In order to make the hood resistant to liquids, it is further coated with polyethylene. The headcover 102 includes a breather tube port 104 for receiving the slotted connector 106 located on breather tube 108. The second connector 110 located on breather tube 108 connects to the output port 112 of air filter unit 130.

Air filter unit 130 includes a conventional blower motor and impeller assembly (hereinafter referred to simply as the "blower motor assembly") 118 located within the air unit's housing 134 which can be better seen in FIG. 2. The blower motor assembly 118 is powered in the preferred embodiment by a removable battery pack 120. Preferably, the battery pack 120 can include rechargeable batteries such as nickel-cadmium batteries or other types of commercially available batteries which can be recharged. Although it is preferable that battery pack 120 be capable of being recharged, the battery pack can also be designed to use non-rechargeable batteries. A filter or filter assembly 124 having a storage or memory device located therewith in accordance with the present invention is electrically connected to the air filter unit via connector 122. Filter assembly 124 in the preferred embodiment includes a HEPA filter 128. Although a HEPA filter is utilized in the preferred embodiment, other types of filtering media may be utilized depending on what level of filtration is needed or the particular application in question. The air unit 130 also includes a cover member 126 which mates to the main air unit housing 134 in order to seal the entire air unit assembly.

A circuit board 114 located within the housing 134 includes an electrical connector 116 for mating to connector 122 located on filter or filter assembly 124. The electronics found on circuit board 114 as will be explained in more detail further below, monitors the time the blower motor assembly 118 is operational and periodically updates the memory device located in filter assembly 124. A visual indicator 132, such as a light emitting diode (LED), which is coupled to circuit board 114 provides a visual indication to the respiratory system user that the filter assembly 124 needs to be replaced, or if another problem is detected with the system. The LED 132 will be activated upon the filter usage circuit determining that the filter assembly 124 has reached the end of its useful service life. The LED 132 can be mounted anywhere on housing 134, but preferably in a location which is conspicuous. Instead of, but preferably in addition to LED 132, an audio indicator, such as a piezo alarm (see item 202 at FIG. 2), is included in order to provide an audible alert to the system user of "end of filter life" and other system conditions.

Figure 2:
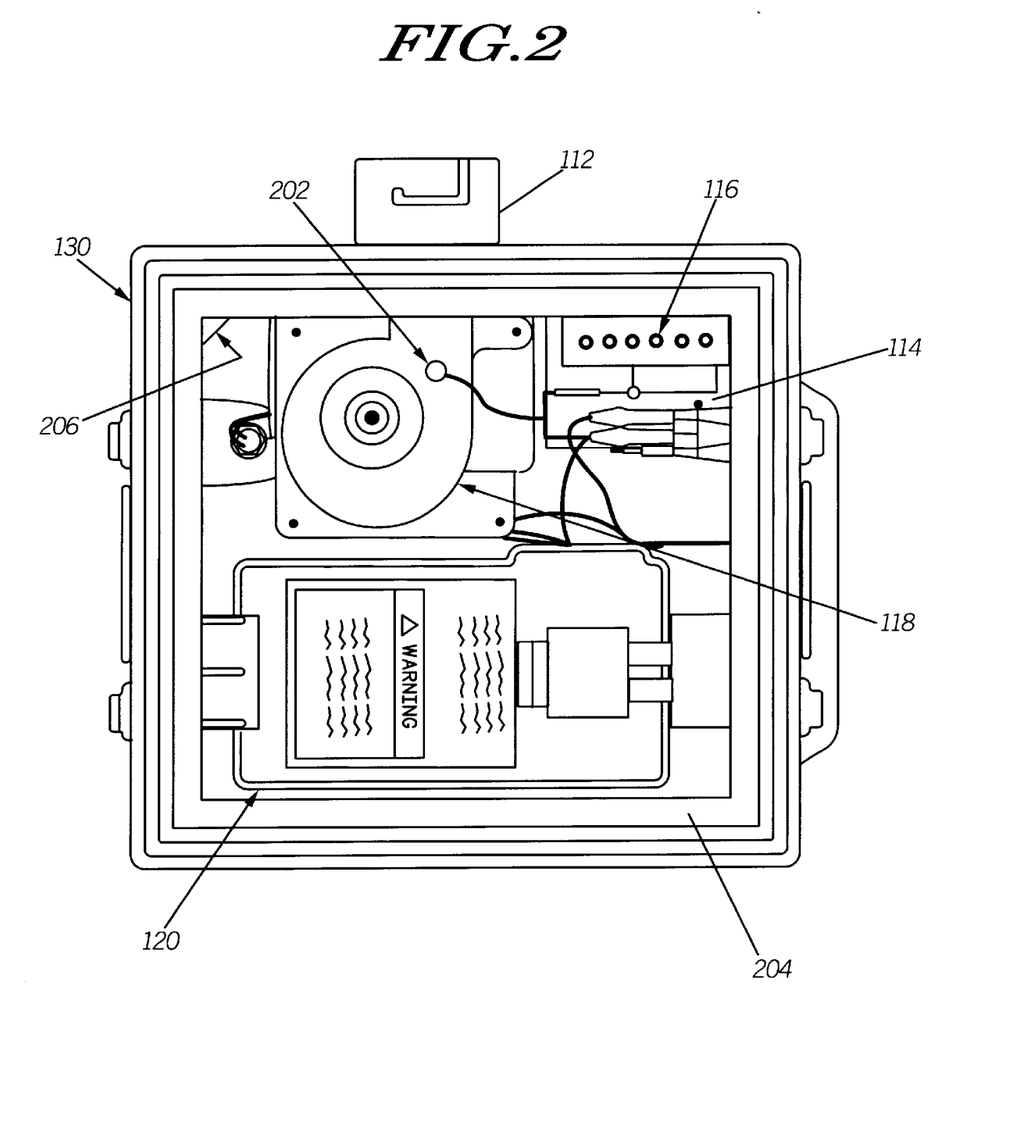
FIG. 2 shows a rear view of the air filter unit of the respiratory system with filter removed.

A rear view of the air unit is shown in FIG. 2 with the cover 126 and filter assembly 124 removed. In operation, blower motor assembly 118 draws ambient air through filter assembly 124 and forces the filtered air out through output port 112. Unfiltered air enters the air unit 130 via vents located on cover 126. The air once filtered by filter assembly 124 moves towards the headcover 102 via breather tube 108. A rubber seal 204 provides a mating seal for air filter assembly 124 around its periphery. Alignment key 206 found on one corner of the opening prevents the filter assembly 124 from being inserted in an incorrect orientation into housing member 134.

The female connector 116 includes a plurality of contacts which interconnect with corresponding contacts found on the male connector 122 located in the removable filter assembly 124. Connectors 116 and 122 electrically interconnect the filter assembly's storage device 402 with the filter usage monitoring circuit located on circuit board 114. To provide further filter end of service life alert capability to the respiratory system user, a piezo alarm 202 electrically coupled to the system usage monitoring circuit provides an audible alert upon the filter assembly 124 reaching the end of its useful service life.

Figure 3:
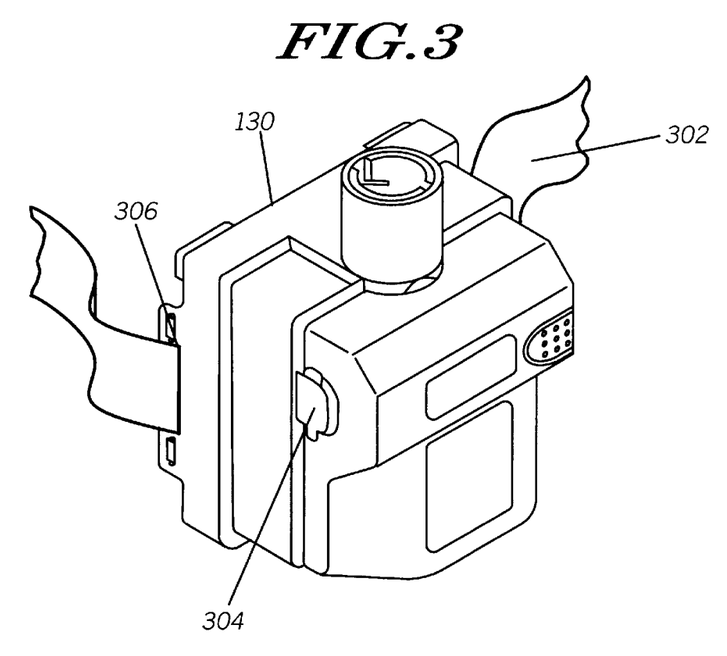
FIG. 3 shows a perspective view of an air filter unit in accordance with the invention.

As shown in FIG. 3, a belt 302 which loops through openings 306 allows the air filter unit 130 to be worn by a user of the equipment. During normal operation, the air filter unit 130 will reside in the back of the user along the waist area. The breather tube 108 will run up the back and neck of the user and into port 104 found in the back of the head cover 102. For battery recharging convenience or for allowing an external battery pack to be interconnected to the air filter unit 130, a charging port or socket 304 is provided on the side of the air filter unit 130. Battery pack 120 located inside of the air filter unit 130 can be charged by plugging in a charger into socket 304. Socket 304 could also be used in situations in which it is desirable to use an external battery pack.

Figure 4:
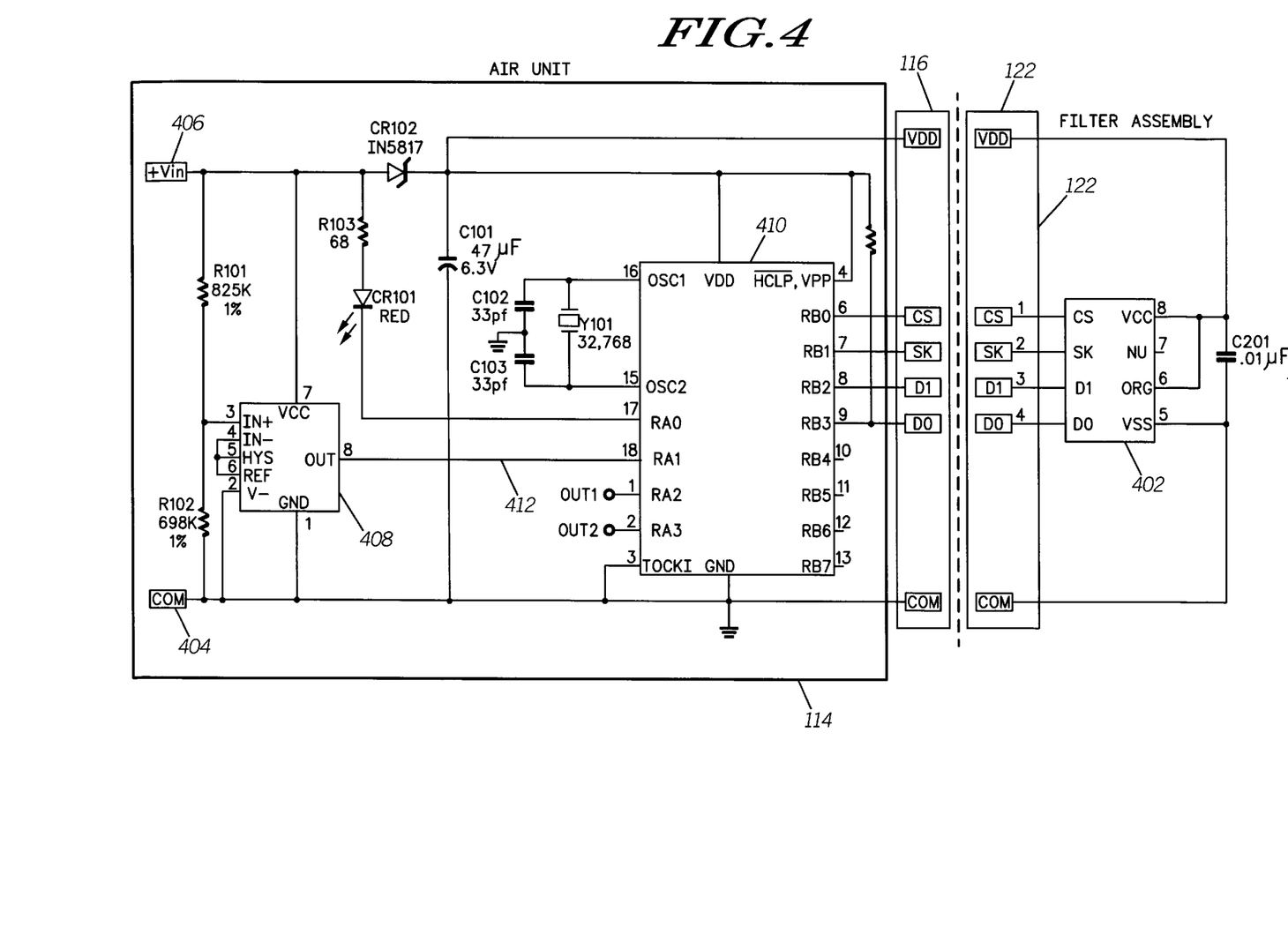
FIG. 4 shows an electrical schematic of the filter and system in accordance with the invention.
Figure 5:
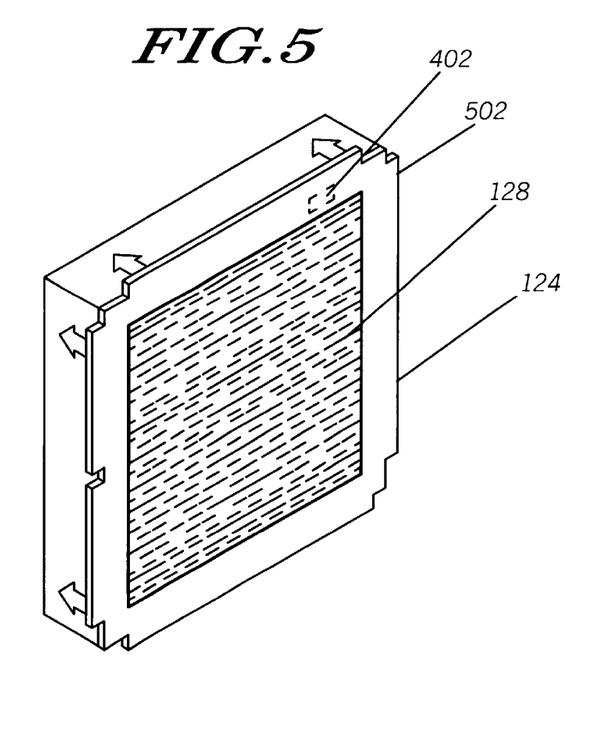
FIG. 5 shows a perspective view of the filter assembly shown in FIG. 1.

Referring now to FIG. 4, an electrical schematic of the electronics located within filter assembly 124 and the circuit board 114 located within air unit 130 are shown. Located in replaceable filter assembly 124 is a storage or memory device 402. Storage device 402 can preferably be encapsulated or embedded within the frame of filter 128 in order to protect it from the external environment (as shown in FIG. 5), or it can be located elsewhere on filter assembly 124. For example, the storage device 402 can be embedded within the filter media, although this may not be the most desirable location since it may take away from the filtering capability of the filter assembly. The storage device 402 could also be attached to the filter's frame member or filter media using one of a number of well known mounting or attachment techniques. In another embodiment, the storage device 402 can be part of an assembly along with connector 122 which can be attached to the filter assembly's housing.

By locating the storage device 402 with the filter or filter assembly 124 such that it is carried by the assembly, a record of the filter's usage will always be available even if the filter assembly is removed and placed in another filtering system as well be explained below. In the preferred embodiment, storage device 402 comprises a 256 bit serial electrically erasable programmable read only memory (EEPROM) embedded within the disposable filter assembly 124. Although an EEPROM is used in the preferred embodiment, other types of conventional nonvolatile storage devices which can be updated can be used in its place. In the preferred embodiment, memory device 402 comprises a 93AA46 EEPROM manufactured by μCHIP, Inc.

Storage device 402 is coupled to connector 122 which electrically interconnects the CHIP SELECT (labeled CS), DATA IN (labeled DI), DATA OUT (labeled DO), positive voltage (VDD), ground (COM) and CLOCK (labeled SK) signals between EEPROM 402 and the corresponding lines located on circuit board 114. Connector 122 serves as the input port for filter assembly 124. Many different types of connectors and electrical interconnection mechanisms as know by those skilled in the art can replace the type of connector 122 used in the preferred embodiment.

A logic level high on the CHIP SELECT line selects the EEPROM 402, while a logic level low on the CHIP SELECT line de-selects the EEPROM 402. The DATA OUT line outputs bits of data from the controller 410 to the EEPROM 402, while the DATA IN line, inputs data bits to the controller 410 from the EEPROM 402. A logic level high on the CLOCK line clocks a serial data bit into or out of the EEPROM 402.

The system usage monitoring circuitry found on circuit board 114 comprises voltage inputs 404 and 406. In the preferred embodiment, voltage inputs 404 and 406 are connected in parallel to the voltage lines connected to blower motor assembly 118 coming from battery pack 120.

As such, only when the blower motor assembly 118 is turned on via an on-off switch located on the air unit's housing 134 will the system usage monitoring circuitry have power applied to it via lines 404 and 406.

A comparator 408 such as a MAX921CSA comparator manufactured by Maxim, Inc. provides a controlled "filtering system operational" signal 412 to controller 410. Signal 412 is a logic high when there is proper voltage provided at voltage inputs 404 and 406. A logic high on line 412 also indicated that power is applied to blower motor assembly 118 and the air unit is causing ambient air to flow through filter 128. Comparator 408 provides a logic high on line 412 when the designed for voltage threshold level is reached. This threshold level is determined by the voltage divider formed by R101 and R102. Comparator 408 also provides conventional hysteresis which helps avoid output logic level toggling between on and off conditions when operating around the threshold voltage level.

Controller 410 preferably comprises a microcontroller which includes built-in EPROM, RAM and input/output ports. Although in the preferred embodiment controller 410 comprises a PIC16LC54A microcontroller manufactured by μCHIP, Inc. any one of numerous commercially available microprocessors or microcontrollers can be used in its place. Instead of using a microcontroller or microprocessor, controller 410 can also be design using conventional discrete components or an ASIC.

A 32,768 Hertz (Hz) crystal Y101 is used as the external oscillator source for the controller 410. Controller port RA0 controls when LED CR101 one of two annunciators found in the air unit is turned on or off. While a first output port from controller 410, labeled OUT1, provides a controlled output voltage to turn on the second annunicator which is a piezo alarm 202. A second output port, labeled OUT2, provides a pulse output every second which can be used by an external device or circuit which is attached to the air unit.

Table 1 below provides a more detailed list of the circuit components found in the schematic shown in FIG. 4.

TABLE 1

| REFERENCE # | DESCRIPTION |
| --- | --- |
| | Parts List for Air Unit Board Assembly (AUBA) |
| C102, C303 | CAPACITOR, 33 PF, 5%, 50V WPO Ceramic (SM 0805) |
| C101 | CAPACITOR, 47 uF, 20%, 6.3V Tantalum (SM CHIP) |
| F101 | CRYSTAL, 32,768 Hz RS, 50K DL, Cp .85 pF (SMD) |
| CR101 | DIODE, LED Red Diffused 20 mcd 10 mh (SM MELF) |
| CR102 | DIODE, Shotky PRV 20 vf .45V LA (SM MELF) |
| 408 | IC, Comparator Low Pwr 2.5V (min) w/Vref (SOICS) |
| 410 | IC, LP uC PIC16LC54A*, 512 EPROM, 32 RAM, OTP LV (SOICS) |
| — | LIGHT PIPE, FOR CR102 |
| AUBAPCB | PCB, .062" FR-4 SMT SS SM |
| R104 | RESISTOR, 10K OHM 5% 1/10W Thin Film (SM 0805) |
| R103 | RESISTOR, 68 OHM 5% 1/10W Metal Film (SM 0805) |
| R102 | RESISTOR, 698K OHM 1% 1/10W Metal Film (SM 0805) |

TABLE 1-continued

| REFERENCE # | DESCRIPTION |
| --- | --- |
| R101 | RESISTOR, 825k OHM 1% 1/10W Metal Film (SM 0805) alternate Part: PIC16LV54A-/80 Parts List for Filter Board Assembly |
| C201 | CAPACITOR, .01 uF 10% 50V X7R Ceramic (SM 0805) |
| 402 | IC, 256-bit serial EEPROM for 2V–5.5V op (SOIC8) |
| FBAPCB | PCT, .062" FR-4 SOLE SIDED SLK SCRB SOLDER MSK |

FIG. 5 shows a perspective view of the filter assembly shown in FIG. 1. In FIG. 5, the filter assembly's housing 502 is shown located along the entire perimeter of filter media 128. The storage device 402 is also highlighted located embedded within housing 502.

Figure 6:
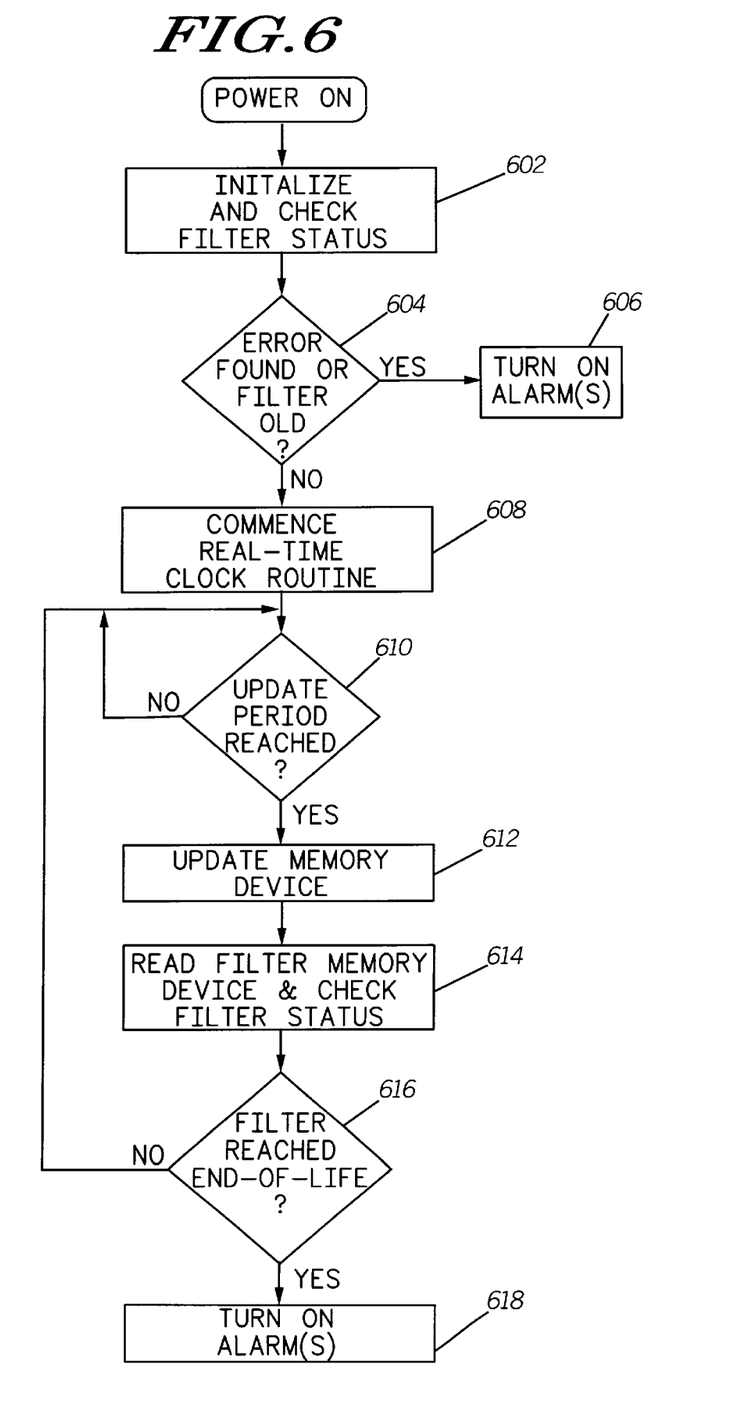
FIG. 6 shows a simplified flowchart which highlights the steps taken to update the filter assembly for use in accordance with the invention.

In FIG. 6, a simplified flowchart highlights the operation of the system in accordance with the preferred embodiment. In step 602, once power is turned on in the air unit 130, the controller 410 goes through a routine initialization routine in which internal flags and registers are initialized and set. During this initialization period, the controller 410 will also run a test routine to make sure that there is communication with the EEPROM 402 and that it is operational. If it is determined that the EEPROM 402 is malfunctioning in step 604, an alarm signal can be generated via one of two annunicators, alarm 202 and/or LED CR101 in order to alert the respiratory system user in step 606.

Preferably, during manufacture of the filter assembly 124, a unique serial number will be programmed into the EEPROM 402 which will help identify the filter assembly 124. Also during manufacture, a filter life threshold value will be programmed into EEPROM 402. The stored filter life threshold will inform the filtering device attached to filter assembly 124, in the preferred embodiment air unit 130, how many hours of operation that particular filter can handle before needing to be replaced. For example, for a particular filter element the filter life threshold might be set at 40 hours. The filter life threshold value will vary depending on the type of filter being used and type of filtering application in question. Both the serial number and filter life threshold will be stored in specific address locations within EEPROM 402. These address locations will be established as "READ-ONLY" locations in order not to corrupt the data.

Also as part of the initialization process, in step 604, the routine will compare the filter life threshold value with the amount of time the filter assembly 124 has been in use by checking a variable stored in EEPROM 402 called the filter usage value and comparing it with the filter life threshold. If it is determined that the filter assembly 124 has reached its end-of-life limit, in step 606, the controller 410 will cause an alarm signal to be generated via alarm 202 and/or LED CR101 in order to alert the respiratory system user that it is time to replace the filter assembly 124. The alarm 202 and/or LED CR101 can provide different types of alarm sequences (e.g., different audible alarms, different blinking rates, etc.) depending if the alarm is based on bad communications between the controller and EEPROM or if the alarm is due to a bad filter element condition.

Once power is available to controller 410 the controller 410 will poll input RA1 to see if there is a logic high on line 412 indicating that the air unit 130 is operational. As soon as input RA1 is determined to be at a logic high, a conventional real-time clock routine performed by the controller's embedded software commences counting the length of time line 412 is asserted high in step 608. In step 610, after a predetermined length of time has elapsed (update period), for example one minute, controller 410 in step 612 will write to the specific address locations where the filter usage value is stored in EEPROM 402 thereby updating the amount of time filter assembly 124 has been actually in service. This write to the EEPROM is accomplished by the controller sending an update message to the EEPROM which causes the filter usage value to be modified.

Those skilled in the art will realize that there are many ways of updating the filter usage value located in EEPROM 402. For example, the update signal sent by the controller 410 in one design can increment the filter usage value, while in another design, the filter usage value can be decremented with each update signal. In the first design, the filter end of life condition will be reached when the filter usage value equals the filter life threshold value (e.g., 40 hours), while in the second design, the filter end of life condition will be reached when the filter usage value equals zero. Other methods of updating a variable as known in the art can also be used in place of the two techniques briefly discussed above in order to keep track of the length of time the filter assembly has been in use.

In step 614, controller 410 will compare the filter life threshold value with the current filter usage value to determine if the filter has reached its end-of-life condition. This is done by reading the EEPROM and performing a simple compare function which is performed by the controller's software routine. If in step 616, it is determined that the filter's usage value has reached the filter life threshold, the controller 410 in step 618 will cause the LED CR101 to commence blinking by asserting port RA0 low. Controller 410 will also cause alarm 202 to emit an audible alarm by asserting port OUT1 in order to further alert the user. If it is determined in step 616, that the filter element has not reached the end of its useful life, the routine will loop back and continue updating the filter usage value locations periodically (e.g., every minute) as long as the air unit 130 is operational.

It is worth noting that the real time clock routine mentioned in step 608 is running continuously while steps 610–616 are performed. The update period mentioned in step 610 is also continuously being cleared and restarted after every periodic update. Also, the routine periodically monitors input RA1 to see if there is sill a logic high on line 412 indicating that the air unit 130 is operational. If input RA1 goes low (indicative that air unit is not operational), the routine will stop incrementing the EEPROM 402.

While the invention has been described in conjunction with specific embodiments, it is evident that many alternatives, modifications, permutations and variations will become apparent to those skilled in the art in light of the foregoing description. For example, although in the preferred embodiment, the input port 122 comprises a separate connector which is electrically coupled to EEPROM 402, the input port could be designed using the same pads of the EEPROM 402 (especially if the EEPROM 402 is encapsulated into the filter assembly housing. Accordingly, it is intended that the present invention embrace all such alternatives, modifications and variations as fall within the scope of the appended claims.

What is claimed is:

1. A respiratory system that comprises:
   a replaceable filter assembly that comprises a filter element and a nonvolatile memory device attached to the filter element; and
   an air unit including a blower motor assembly and a controller circuit; wherein
   the controller circuit determines the amount of time the blower motor assembly is operational and provides an update signal for storage in the nonvolatile memory device which is indicative of the length of time the blower motor has been operational.

2. The respiratory system of claim 1, wherein the controller circuit periodically updates the nonvolatile memory device by sending periodic update signals during the time the blower motor assembly is operational.

3. The respiratory system of claim 1, wherein the air unit and replaceable filter assembly both include connectors that allow for the electrical interconnection of the controller and the nonvolatile memory device.

4. The respiratory system of claim 1 further comprising:
   a controller for monitoring the amount of time the filtering assembly is operational and periodically sending an update signal to the nonvolatile memory device.

5. The respiratory system of claim 4, wherein the update signal causes a filter usage value stored in the nonvolatile memory device to change value, the filter usage value providing an indication on the amount of time the filter element has been in use.

6. The respiratory system of claim 5, wherein the controller periodically compares the filter usage value to a filter life threshold value to determine if the filter element has reached its end-of-life condition.

7. The respiratory system of claim 6, further comprising:
   an annunciator; and wherein
   the controller causes the annunciator to provide an alert if the controller determines that the filter element has reached its end-of-life condition.

8. The respiratory system of claim 6, wherein the respiratory system comprises a powered-air respiratory system that includes an air unit having a blower motor assembly, and the controller determines the amount of time the blower motor assembly is operational and sends the update signal to the input port periodically as long as the blower motor assembly is operational.

* * * * *